(12) United States Patent
Wright et al.

(10) Patent No.: US 9,088,899 B2
(45) Date of Patent: *Jul. 21, 2015

(54) COMPUTATIONAL SYNDROME DETECTOR

(75) Inventors: Steven Wright, Roswell, GA (US); Barrett Kreiner, Woodstock, GA (US); Edgar Shrum, Jr., Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 521 days.

This patent is subject to a terminal disclaimer.

(21) Appl. No.: 13/569,956

(22) Filed: Aug. 8, 2012

(65) Prior Publication Data

US 2012/0302231 A1    Nov. 29, 2012

Related U.S. Application Data

(63) Continuation of application No. 11/969,131, filed on Jan. 3, 2008, now Pat. No. 8,254,909.

(51) Int. Cl.
*H04W 24/00* (2009.01)
*H04W 36/08* (2009.01)

(52) U.S. Cl.
CPC .............. *H04W 24/00* (2013.01); *H04W 36/08* (2013.01)

(58) Field of Classification Search
CPC ............................. H04W 24/00; H04W 36/08
USPC .................. 455/421–425, 67.11–67.17, 41.2, 455/456.1–457, 440–446, 450–453
See application file for complete search history.

(56) References Cited

U.S. PATENT DOCUMENTS

| | | | |
|---|---|---|---|
| 5,023,900 A | | 6/1991 | Tayloe et al. |
| 5,226,071 A | * | 7/1993 | Bolliger et al. ............ 455/435.3 |
| 5,761,240 A | | 6/1998 | Croucher, Jr. |
| 6,011,970 A | | 1/2000 | McCarthy |
| 6,111,870 A | | 8/2000 | Kurtz |
| 6,650,896 B1 | | 11/2003 | Haymes et al. |
| 6,721,572 B1 | | 4/2004 | Smith et al. |
| 6,795,707 B2 | | 9/2004 | Martin et al. |
| 6,801,756 B1 | | 10/2004 | Agrawal et al. |
| 7,155,167 B1 | | 12/2006 | Carty |

(Continued)

OTHER PUBLICATIONS

USPTO, "Office Action," issued in connection with U.S. Appl. No. 11/969,131, dated Jun. 24, 2011 (7 pages).

(Continued)

*Primary Examiner* — Sharad Rampuria
(74) *Attorney, Agent, or Firm* — Hanley, Flight & Zimmerman, LLC

(57) ABSTRACT

Example methods disclosed herein to monitor wireless system operation include processing a plurality of session records describing characteristics of wireless sessions in a coverage area of a wireless system to determine a first time interval for a first wireless device to propagate from a first access point in the coverage area to a second access point in the coverage area, determining a coverage area traversal rate for the first wireless device based on the first time interval, the coverage area traversal rate corresponding to a rate at which the first wireless device is traversing the coverage area, and providing a wireless service advisory for the coverage area to a second wireless device based on the coverage area traversal rate for the first wireless device.

18 Claims, 4 Drawing Sheets

(56) References Cited

U.S. PATENT DOCUMENTS

| | | |
|---|---|---|
| 7,941,108 B2 | 5/2011 | Shaffer et al. |
| 8,059,011 B2 | 11/2011 | Van Wyk et al. |
| 8,111,151 B2 | 2/2012 | Zhu et al. |
| 2005/0020284 A1 | 1/2005 | Benco et al. |
| 2006/0183487 A1 | 8/2006 | Allen et al. |
| 2009/0131081 A1 | 5/2009 | Abdel-Kader et al. |

OTHER PUBLICATIONS

USPTO, "Office Action," issued in connection with U.S. Appl. No. 11/969,131, dated Dec. 28, 2011 (9 pages).

USPTO, "Notice of Allowance," issued in connection with U.S. Appl. No. 11/969,131, dated Apr. 26, 2012 (13 pages).

\* cited by examiner

COMPUTATIONAL SYNDROME DETECTOR

RELATED APPLICATION(S)

This patent arises from a continuation of U.S. patent application Ser. No. 11/969,131, entitled "Computational Syndrome Detector" and filed on Jan. 3, 2008, which is hereby incorporated by reference in its entirety.

BACKGROUND

Devices that use wireless signaling are ubiquitous to contemporary life. Non-limiting examples of such devices include cellular telephones, text messaging units, personal digital assistants (PDAs), and laptop and palmtop computers. Respective such devices typically include one or more modes of operation such as, for example, unidirectional or bidirectional voice, video and/or data communications, Internet accessibility, remote control functionality, etc.

However, such devices are dependent upon access to wireless resources (i.e., networks or infrastructure) external to the device in order for corresponding wireless functions to operate. For example, a cellular telephone requires a period of continuous signal access to a cellular network in order to initiate and maintain a call. Such external resources are, as a matter of practicality, finite in their geographic coverage range and scope of operational modes. In short, worldwide coverage for all wireless devices, everywhere that a user might want or need signal access, is not a reality.

Various factors result in poor or failed wireless signal access in areas that are otherwise seemingly adequately provisioned. In one example, a user is denied wireless access while stuck in traffic because of unusually high wireless system usage. In another example, a user temporarily loses wireless signal access while traveling behind a large structure in a downtown area, resulting in a "dropped" cellular phone call. These and other scenarios cause frustration and loss of productivity for users of wireless technology.

SUMMARY

This summary is provided to introduce general concepts of wireless signal analysis and reporting methods and systems, which are further described below in the Detailed Description. This summary is not intended to identify essential features of the claimed subject matter, nor is it intended to limit the scope of the claimed subject matter.

In one aspect, a method is performed at least in part by a computer. The method includes analyzing a plurality of wireless signal session data records. The method also includes detecting a predefined relationship in accordance with the analysis, wherein the relationship involves one or more wireless signal performance metrics within a geographical area. The method further includes generating a report in accordance with the detecting.

In another aspect, at least one computer-readable storage media includes a program code. The program code is configured to cause one or more processors to analyze a plurality of wireless signal session data records. The program code is also configured to cause the one or more processors to detect a selectively definable pattern in accordance with the analysis. The pattern involves one or more wireless signal performance metrics within a geographical area. The program code is further configured to cause the one or more processors generate a report in accordance with the detecting.

In yet another aspect, at least one computer-readable storage media includes a program code. The program code is configured to cause one or more processors of a wireless system to analyze a plurality of wireless signal session data records corresponding to two or more distinct wireless service users. The program code is also configured to cause the one or more processors to detect a selectively definable pattern in accordance with the analysis. The pattern involves at least one wireless signal performance metric within a geographical area. The program code is further configured to cause the one or more processors to generate a report in accordance with the detecting, wherein the report is configured to be accessed by one or more resources of the wireless system.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview:

This disclosure is directed to providing analysis and detection of relationships and patterns within a plurality of wireless signal session data records. The analytical methods provided herein are also referred to as Syndrome Detection because the detected patterns and relationships are typically, but not necessarily, indicative of corresponding real-world circumstances (syndromes). Non-limiting examples of such relationship/syndrome correlations include non-propagating cellular phone traffic due to an automobile collision, sudden full-capacity loading of a wireless Internet access hub due to the arrival of an international flight at an airport, and so on.

Figure 1:
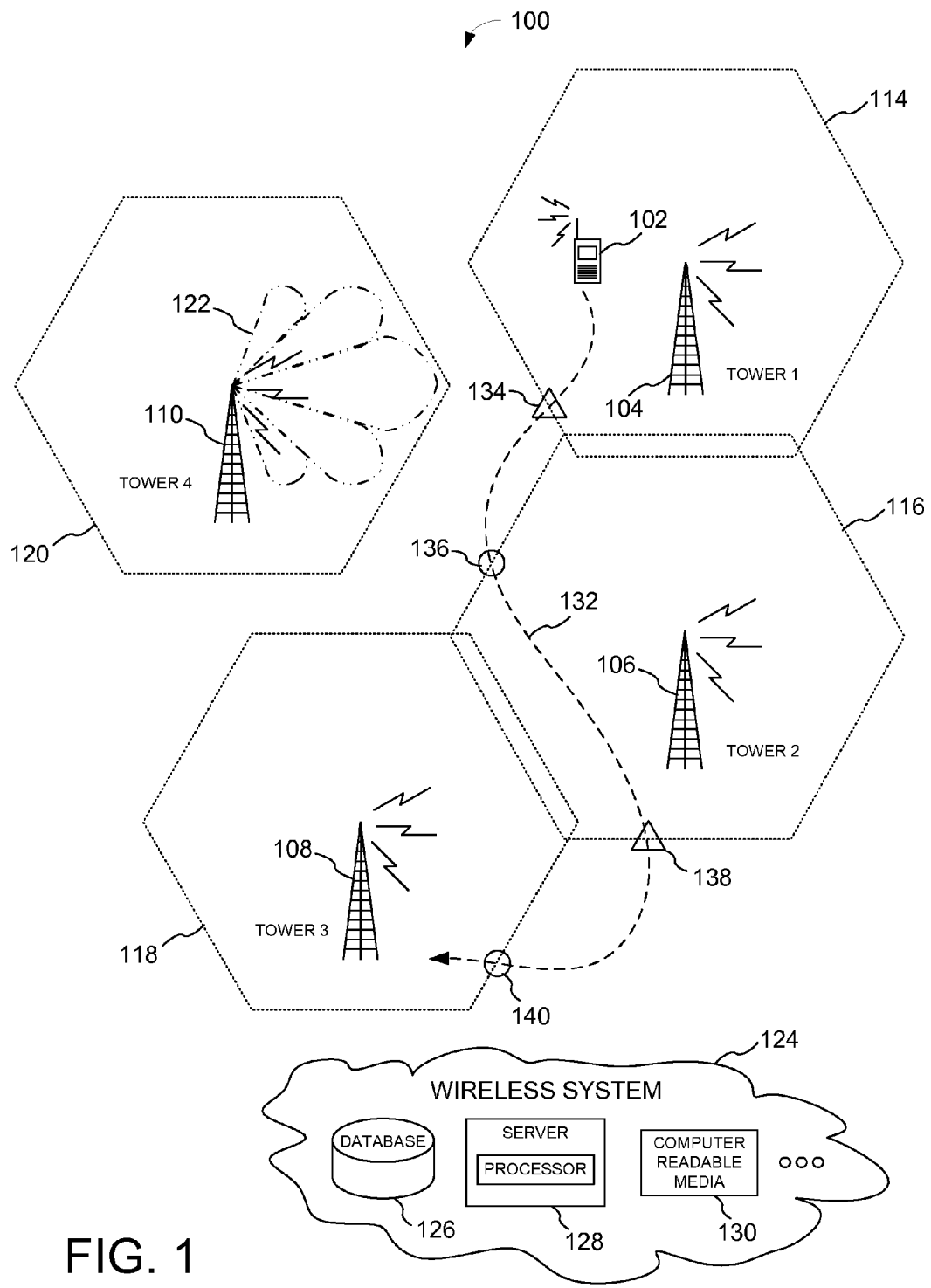
FIG. 1 is a diagrammatic view depicting an illustrative operating scenario.

Illustrative Operating Scenarios:

FIG. 1 is a diagrammatic view depicting an illustrative operating scenario 100. In FIG. 1, a wireless device 102 is present and is presumed to be operated by a corresponding user (not shown). For purposes of ongoing example, it is assumed that the wireless device 102 is a cellular telephone. Other wireless devices 102 (e.g., laptop computers, PDAs, etc.) corresponding to other, similar operational scenarios are also contemplated within the scope of the present teachings. The wireless device 102 is portable in nature and is configured to operate in one or more modes as the user moves about within a wireless signal coverage area.

The scenario 100 also includes four cellular service towers 104, 106, 108 and 110, respectively. Each of the cellular towers 104, 106, 108, 110 includes an area of cellular (i.e., wireless) signal coverage 114, 116, 118 and 120, respectively. It is further noted that some of the coverage areas (e.g., 114 and 116; 116 and 118) exhibit some degree of overlap with each other. While the respective signal coverage areas 114, 116, 118, 120 are represented in FIG. 1 as hexagonal in shape, one of ordinary skill in the related arts will appreciate that such representation is a simplification for ease of understanding. In any case, each cellular service tower 104, 106, 108, 110 can provide signal coverage to a finite region about the respective tower. The cellular service tower 110 further includes a finite range of Wi-Fi® signal service as represented by coverage lobes 122. Wi-Fi® is a registered trademark owned by Wireless Ethernet Compatibility Alliance, Inc., Austin, Tex., USA.

The cellular towers 104, 106, 108, 110 are coupled to a wireless system (i.e., infrastructure) 124 (such coupling is not depicted in FIG. 1). The wireless system 124 includes a database 126, a server 128 and computer-readable storage media 130. Non-limiting examples of computer-readable storage media 130 include one or more optical disks, one or more magnetic storage media, one or more solid state memory devices, etc. The wireless system 124 can include any other resources (not shown) as needed to support one or more wireless services (e.g., cellular telephone, Internet access, etc.) for wireless devices (e.g., 102). Non-limiting examples of such wireless system 124 resources include additional databases, additional servers and/or computer systems, wireless signal analysis instrumentation, network and/or Internet access bridges, public switched telephone network (PSTN) interface equipment, wireless signal receivers, transmitters and/or transceivers, etc.

In one illustrative operation, a user of the wireless device 102 traverses a path 132. In doing so, the user leaves the signal coverage area 114 at point 134 (represented by a triangle) and eventually enters the signal coverage area 116 at a point 136 (represented by a circle). The user continues to move along the path 132 and leaves the signal coverage area 116 at a point 138 and later enters the signal coverage area 118 at a point 140. Thus, the user experiences a loss of wireless signal (e.g., cellular) access between the points 134, 136 and between the points 138, 140. One or more wireless operations are not possible along the path 132 between the points 134, 136 and the points 138, 140, giving rise to two "blackout periods" in the context of this illustration. Such blackout periods are a primary cause of frustration and inefficiency for users of wireless devices.

Figure 2:
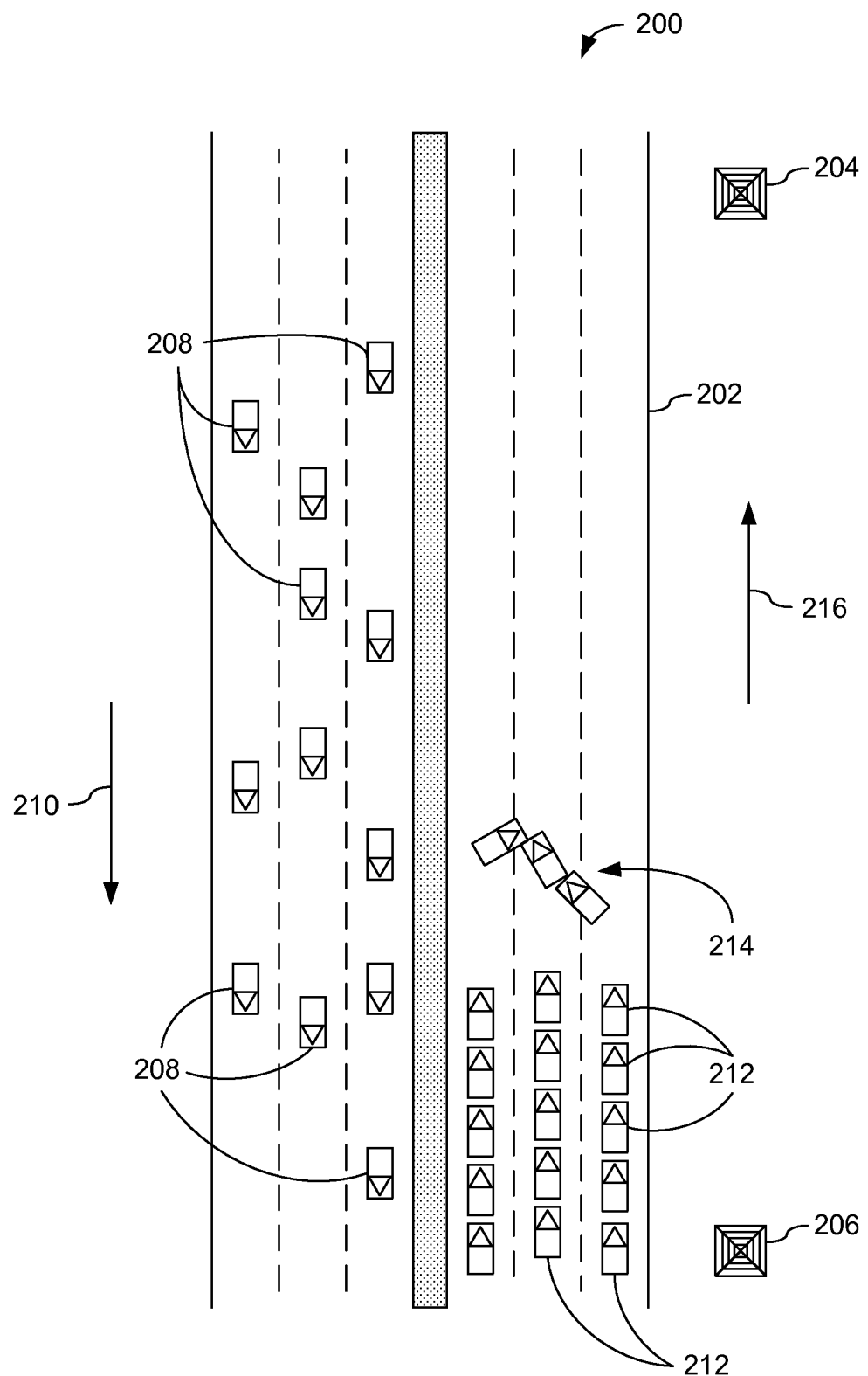
FIG. 2 is a plan diagrammatic view depicting another illustrative operating scenario.

FIG. 2 is a diagrammatic view depicting another illustrative operating scenario 200. In FIG. 2, a divided highway 202 carries bidirectional automobile traffic. First and second cellular service towers 204 and 206, respectively, are located within wireless service range of the highway 202. Automobiles 208 traverse the highway 202 in a first direction 210.

As also depicted, automobiles 212 are at a stop along highway 202 due to a blocking collision 214. Thus, automobiles 212 are not able to proceed in their designated direction 216. Any wireless devices (not shown) within the automobiles 212 are within service range (i.e., coverage area) of the second cellular tower 206, and are not within service range of the first cellular tower 204. In this way, any active such wireless devices (e.g., cellular telephones) within the automobiles 212 are in "stasis", continuously accessing cellular services by way of the second cellular tower 206. These same wireless devices are not propagating to the first cellular tower 204 as would be the case during normal traffic flow.

Heavy cellular call traffic is therefore occurring by way of the second cellular tower 206. In the scenario 200, such call traffic accumulates in accordance with the growing number of stopped automobiles 212, giving rise to access saturation on the cellular tower 206. The cellular tower 206 becomes loaded to capacity, and additional cellular calls (i.e., wireless signal services) cannot be handled within the corresponding coverage area. Detection of situations (i.e., syndromes) similar to the scenario 200 can be advantageously leveraged by commercial wireless service providers and the users that access their systems.

Figure 3:
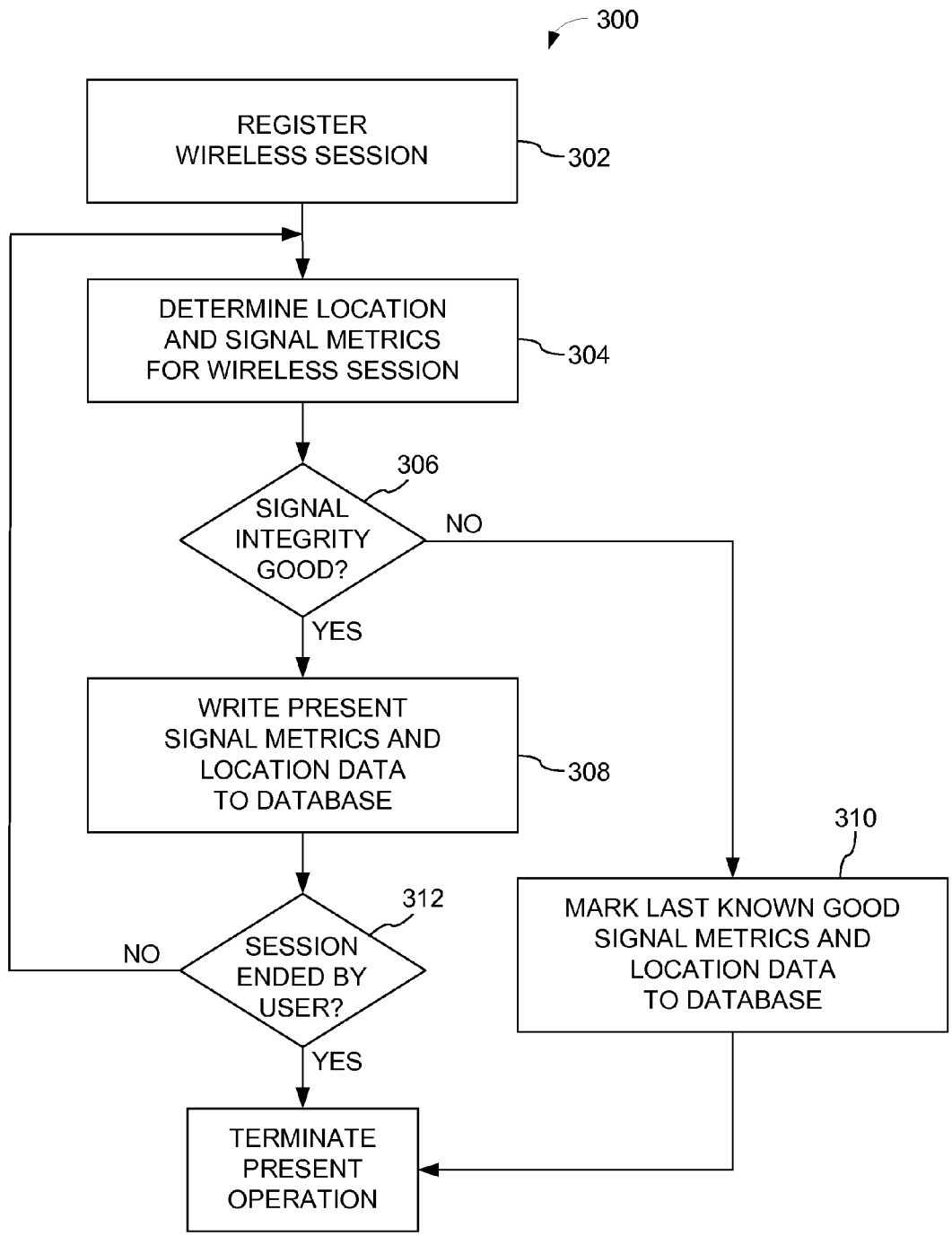
FIG. 3 is a flow diagram depicting a method in accordance with one embodiment.

Illustrative Data Acquisition:

FIG. 3 is a flow diagram depicting a method 300 in accordance with one embodiment. The method 300 includes particular method steps and a particular order of execution. However, other embodiments can also be used that deviate in one or more respects from the method 300 without departing from the scope of the present teachings. For purposes of understanding, certain aspects of the method 300 will be described with reference to the operational scenario 100 of FIG. 1.

At 302, a wireless session is registered for a wireless device, such as the wireless device 102, by the wireless system 124. As used herein, "wireless session" refers to a period of time during which the wireless device 102 accesses the supporting wireless system 124. A wireless session typically, but not necessarily, involves communication between the wireless device 102 and one or more other entities (wireless or otherwise), access and use of the Internet or another network resource, access and use of one or more databases, etc. "Registration" refers to establishing communication between the wireless device 102 and the wireless system 124 and, in one or more embodiments, initiating a record within the database 126 of the wireless session. Such an initial record can include, for example, device and/or user identification, time and date, one or more wireless signal protocol types, and the nature and/or identity of resources to be accessed. Other initial information can also be included in the database 126 record.

At 304, the instantaneous geographic location and signal metrics for the present wireless session are determined by resources of the system 124. The geographic location of the wireless device 102 can be determined in any suitable way including, as non-limiting examples, global position system (GPS) signals received by the wireless device 102 and communicated to the wireless system 124, triangulation on the wireless device 102 by way of fixed wireless access points (e.g., cellular towers 104, 106, 108, 110). Other methods of determining geographic location of the device 102, with some acceptable measure of precision, can also be used. Wireless signal metrics can include any quantified or classified wireless signal parameter of the wireless session including, for example, overall signal strength, signal-to-noise ratio (SNR), failed versus successful wireless signal session status, etc. Other quantified and/or classified wireless signal parameters can also be defined as wireless signal metrics.

At 306, the signal integrity of the wireless session is evaluated using one or more of the signal metrics determined at 304 above. If the signal integrity is evaluated as inadequate in comparison to one or more predetermined criteria—or if wireless communication with the wireless device 102 has failed altogether—then the method 300 proceeds to 310 as described below. If the signal integrity is determined to be acceptable, then the method 300 proceeds to 308 below.

At 308, the geographic location and signal metrics for the wireless session determined at 304 above are written to the database 126 as initiated at 302 above. The method 300 then proceeds to 312 below.

At 310, the last known good geographic location and signal metrics for the wireless session (as acquired on a previous iteration of steps 304, 306, 308) are marked or tagged as such within the database 126. The method 300 then terminates.

At 312, it is determined if the present wireless session has been ended (terminated) by the user of the wireless device 102. Such determination can be based upon, for example, communication of an "END CALL" data signal from the wireless device 102 to the system 124. The wireless session can be ended in other known ways, as well. If the wireless session has been ended, then such an indication is written to the database 126 and the method 300 then terminates. If the wireless session has not been ended by the user, the method 300 returns to 304 above.

The method 300 represents one suitable embodiment for acquiring data pertaining to wireless sessions and storing that data (typically, but not necessarily) as discrete records (one record per wireless session) into a database, such as the database 126. In this way, a growing deposit of information, representative of one or more wireless signal service users, can be accumulated over time and analyzed for meaningful correlations. As one example, correlations between poor signal strength or "call dropping", and a particular geographic location, can indicate localities where additional wireless system 124 resources are needed. Furthermore, such information can be used to advise users of wireless devices about areas prone to, or presently experiencing, wireless access trouble.

The method 300 of FIG. 3 is illustrative of numerous wireless session data acquisition schemes in accordance with the present teachings. Other methods including some or all of the steps 302, 304, 306, 308, 310, 312 described above, or other steps, and/or other sequences of execution can also be used and are within the scope of the present teachings. The method 300 can be implemented by way of any suitable construct such as, for example, one or more processors under software (e.g., media 130) control, one or more dedicated-purpose apparatus, etc. Furthermore, multiple instances of the method 300 can be performed simultaneously, each instance corresponding to a respective wireless session and associated user.

Figure 4:
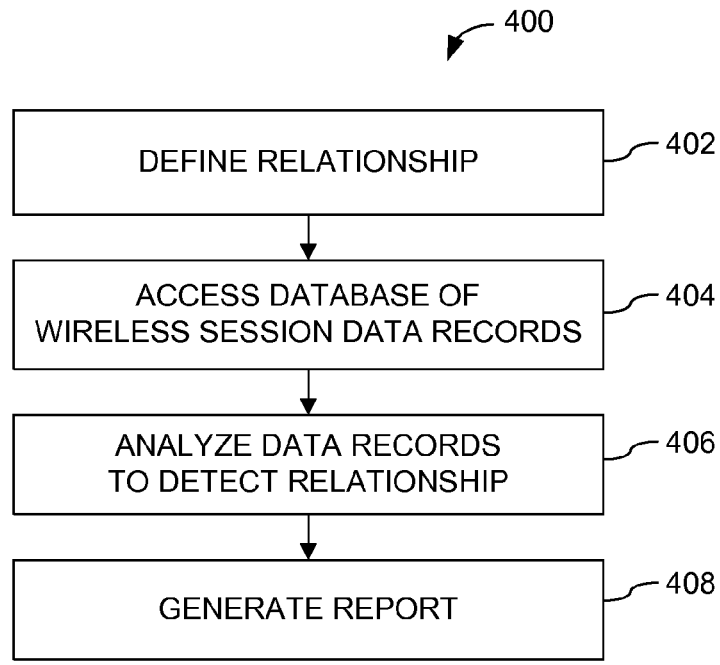
FIG. 4 is a flow diagram depicting a method in accordance with another embodiment.

Illustrative Syndrome Detection:

FIG. 4 is a flow diagram depicting an illustrative method 400 of syndrome detection in accordance with another embodiment. The method 400 includes particular method steps and a particular order of execution. However, other embodiments can also be used that deviate in one or more respects from the method 400 without departing from the scope of the present teachings. For purposes of illustration, the method 400 will be described with reference to the operational scenario 100 of FIG. 1.

At 402, one or more resources of a wireless system, such as the wireless system 124, are used to selectively define a relationship (or pattern) to be detected (i.e., sought) within a plurality of wireless signal session data records. Such a relationship involves one or more wireless signal performance metrics within a geographic area. Non-limiting examples of such relationships are described in further detail hereinafter. The relationship can be defined at the time of the execution of method 400, or previously defined and retrieved from the database 126 or another resource of the wireless system 124. In any case, the relationship is selectively definable in accordance with user (e.g., system administrator) input and can involve correlation of any suitable number of variables and/or parameters.

At 404, one or more resources of the wireless system 124 access the database 126, which includes a plurality of wireless signal session data records. The database 126 can include, for example, data records written thereto in accordance with the method 300 of FIG. 3.

At 406, the plurality of wireless signal session data records are analyzed to detect, or attempt to detect, the relationship defined at 402 above. Such analysis can include, for example, regression analysis, probabilistic analysis, or any other suitable analytical, comparative and/or correlative technique. In one example, all of the data records are analyzed in order to detect the relationship. In another example, the data records are first suitably filtered prior to further analysis. Such filtering can, for example, be performed on the basis of a particular geographic area, wherein data records outside the geographic area are not with the analytical set. Other suitable data preparation and handling techniques can also be used.

At 408, a report is generated in accordance with the detection (or lack thereof) at 406 above. The report is typically, but not necessarily, stored within the database 126 or another resource of the wireless system 124 for immediate and/or later use. The report can, for example, be configured for access and use by other resources (e.g., the server 128, etc.) of the wireless system 124. In one or more embodiments, the report is configured (i.e., formatted) to be disseminated to a wireless device, such as the wireless device 102. In this way, a user of the wireless system 124 can make use of the information within the report.

The methods 300 and 400, and any respective variations thereon, can be implemented in any number of suitable ways. Non-limiting examples of such implementations can include one or more processors under software (program code) control, one or more dedicated purpose apparatus, suitably configured resources within a wireless system (e.g., 124), etc.

Figure 5:
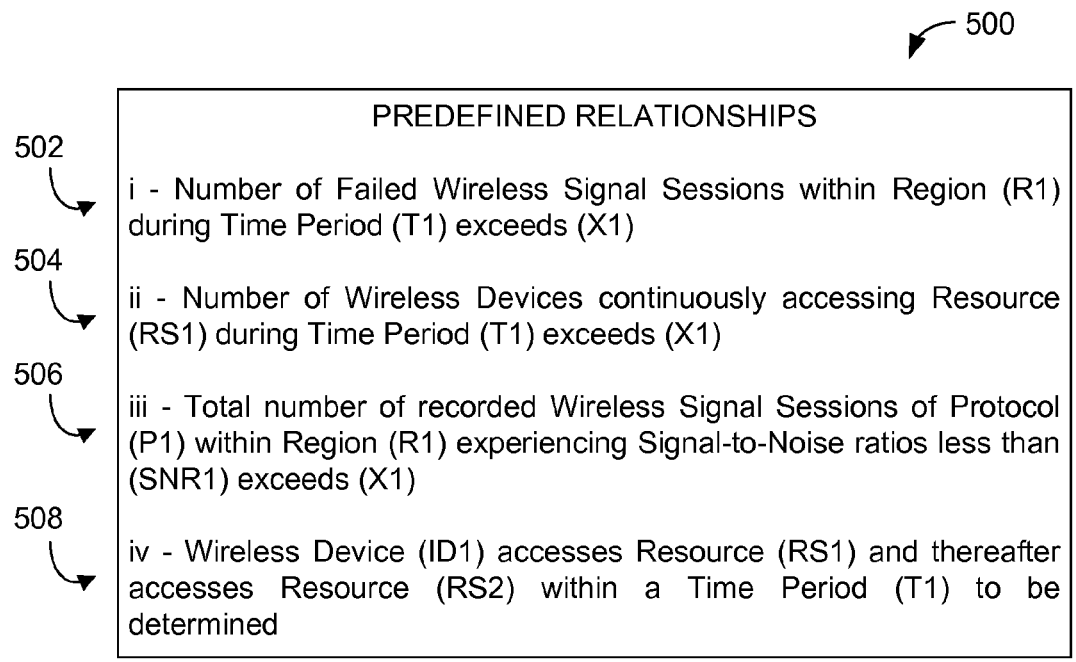
FIG. 5 is a listing depicting illustrative predefined relationships in accordance with yet another embodiment.

FIG. 5 includes a listing 500 of illustrative predefined relationships that can be sought and detected within a set of wireless signal session data records. The listing 500 is non limiting in nature and various other relationships can be selectively defined and used within the scope of the present teachings.

The listing 500 includes a first relationship 502. The first relationship 502 is directed to detecting failed wireless signal sessions with a particular geographic region over a certain time period. According to exemplary embodiments, the first relationship 502 includes a region variable R1, a time period variable (or range) T1, and a threshold variable X1. The respective variables R1, T1 and X1 can correspond to any suitable scalars and units (i.e., vectors) such as, for example: R1=cellular service zone 44; T1=14:00-22:00 on 10 Jan. 2006; and X1=40 failures. Other variables and units can also be defined and used. The first relationship 502, as depicted, is ambivalent to the particular identity of the users/wireless devices involved in the detection, but is concerned with a particular cellular service zone and time/date period. Thus, the first relationship 502 is generally directed to detecting a "dropped calls" syndrome.

The listing 500 also includes a second relationship 504. According to exemplary embodiments, the second relationship 504 is directed to detecting the number of wireless devices, in excess of some threshold, that are continuously accessing a common wireless system resource over a period of time. Such a relationship, for example, can be directed to detecting stopped or "backed up" traffic along a particular section of roadway with the service range of a wireless service resource (e.g., operating scenario 200 of FIG. 2). The second relationship 504 may include a resource variable RSI, a time period variable TI and a threshold variable X1. Illustrative scalars and units can be defined, for example, as: RSI=cellular tower 123XYZ; TI=11:00-11:05 continuously on 12 Jun. 2007; and X1=40 distinct wireless devices. Other variables and units can also be defined and used. The second relationship 504, as depicted, involves respective identities of the users/wireless devices so as to detect continuous access over the time period under consideration. Thus, the second relationship 504 is generally directed to detecting a syndrome involving a lack of propagation of a wireless signal sessions along a wireless service corridor.

The listing 500 also includes a third relationship 506. According to exemplary embodiments, the third relationship 506 is directed to detecting if the total number of wireless signal sessions within a particular region, of a particular protocol type, that experienced a signal to-noise ratio over a certain value exceeds a defined count. The relationship 506, for example, can be directed to detecting a syndrome involving inadequate service quality of a particular protocol type within a coverage area. In accordance with exemplary embodiments, the third relationship 506 includes a protocol variable PI, a region variable RI, a signal-to-noise ratio variable SNRI, and a threshold variable X1. Illustrative scalars and units of the relationship 506 can be defined, for example, as: PI=Wi-Fi®; region=hub 17; SNR=4.0 dB; and X1=90 wireless sessions total. Other suitable variables and units can also be defined and used.

The listing 500 also includes a fourth relationship 508. According to exemplary embodiments, the fourth relationship 508 is directed to detecting the time period over which a particular wireless device propagates (i.e., is passed along) between first and second wireless resources. Thus, the relationship 508 is directed to determining the rate at which the particular wireless device is traversing through a wireless signal coverage area. In accordance with exemplary embodiments, the fourth relationship 508 includes a wireless device identification variable ID1, a resource variable RS1 and a resource variable RS2, and a time period variable T1 that is to be detected or determined. Thus, the relationship 508 includes three input variable and one output variable when considered in the context of a function. Illustrative vectors of the relationship 508 can be defined, for example, as: IDI=serial number 123456789; RSI=cellular tower 25; RS2=cellular tower 26; and T1 (to be determined)=seconds between respective, consecutive accesses. Other suitable variables and units can also be defined and used.

The listing 500 of the relationships 502, 504, 506, 508 is illustrative and non limiting. Any number of various, suitable relationships that can be defined and detected (i.e., searched for) within a plurality of wireless signal session data records within the scope of the present teachings. Reports resulting from respective relationship detections can be put to immediate or future use. Reports can be leveraged for improving wireless signal services within a region or throughout a system, for providing wireless service advisories to users, etc.

The methods 300 and 400, and any respective variations thereon, can be implemented in any number of suitable ways. Non-limiting examples of such implementations can include one or more processors under software (program code) control, one or more dedicated purpose apparatus, suitably configured resources within a wireless system (e.g., 124), etc.

CONCLUSION

Although the disclosure has been made in language specific to structural features and/or methodological acts, it is to be understood that the disclosed concepts are not necessarily limited to the specific features or acts described. Rather, the specific features and acts are disclosed as exemplary implementations.

What is claimed is:

1. A method to monitor wireless system operation, the method comprising:
   processing, using a processor, a plurality of session records describing characteristics of wireless sessions in a coverage area of a wireless system to determine a first time interval for a first wireless device to propagate from a first access point in the coverage area to a second access point in the coverage area;
   determining, using the processor, a coverage area traversal rate for the first wireless device based on the first time interval, the coverage area traversal rate corresponding to a rate at which the first wireless device is traversing the coverage area; and
   providing a wireless service advisory for the coverage area to a second wireless device based on the coverage area traversal rate for the first wireless device.

2. A method as defined in claim 1 wherein processing the plurality of session records includes performing at least one of regression analysis or probabilistic analysis of at least some of the plurality of wireless signal session data records.

3. A method as defined in claim 1 wherein the plurality of session records are associated with a respective plurality of wireless devices.

4. A method as defined in claim 1 further comprising:
   retrieving the plurality of session records from a database; and
   filtering the plurality of session records based on a geographic location of the coverage area.

5. A method as defined in claim 1 wherein a first session record for a first wireless session associated with the first wireless device includes:
   a device identifier for the first wireless device;
   identification information for each access point accessed by the wireless device during first wireless session; and
   time information.

6. A method as defined in claim 5 wherein processing the plurality of session records includes comparing corresponding fields in the plurality of session records to a specified device identifier variable identifying the first wireless device, a first specified resource variable identifying the first access point and a second specified resource variable identifying the second access point.

7. A tangible machine readable storage device or storage disk comprising machine readable instructions which, when executed, cause a machine to perform operations comprising:
   processing a plurality of session records describing characteristics of wireless sessions in a coverage area of a wireless system to determine a first time interval for a first wireless device to propagate from a first access point in the coverage area to a second access point in the coverage area;
   determining a coverage area traversal rate for the first wireless device based on the first time interval, the coverage area traversal rate corresponding to a rate at which the first wireless device is traversing the coverage area; and
   providing a wireless service advisory for the coverage area to a second wireless device based on the coverage area traversal rate for the first wireless device.

8. A storage device or storage disk as defined in claim 7 wherein processing the plurality of session records includes performing at least one of regression analysis or probabilistic analysis of at least some of the plurality of wireless signal session data records.

9. A storage device or storage disk as defined in claim 7 wherein the plurality of session records are associated with a respective plurality of wireless devices.

10. A storage device or storage disk as defined in claim 7 wherein the operations further comprise:
    retrieving the plurality of session records from a database; and
    filtering the plurality of session records based on a geographic location of the coverage area.

11. A storage device or storage disk as defined in claim 7 wherein a first session record for a first wireless session associated with the first wireless device includes:
- a device identifier for the first wireless device;
- identification information for each access point accessed by the wireless device during first wireless session; and
- time information.

12. A storage device or storage disk as defined in claim 11 wherein processing the plurality of session records includes comparing corresponding fields in the plurality of session records to a specified device identifier variable identifying the first wireless device, a first specified resource variable identifying the first access point and a second specified resource variable identifying the second access point.

13. An apparatus to monitor wireless system operation, the apparatus comprising:
- a memory to store machine readable instructions; and
- a processor to execute the machine readable instructions to cause the processor to perform operations comprising:
  - processing a plurality of session records describing characteristics of wireless sessions in a coverage area of a wireless system to determine a first time interval for a first wireless device to propagate from a first access point in the coverage area to a second access point in the coverage area;
  - determining a coverage area traversal rate for the first wireless device based on the first time interval, the coverage area traversal rate corresponding to a rate at which the first wireless device is traversing the coverage area; and
  - providing a wireless service advisory for the coverage area to a second wireless device based on the coverage area traversal rate for the first wireless device.

14. An apparatus as defined in claim 13 wherein processing the plurality of session records includes performing at least one of regression analysis or probabilistic analysis of at least some of the plurality of wireless signal session data records.

15. An apparatus as defined in claim 13 wherein the plurality of session records are associated with a respective plurality of wireless devices.

16. An apparatus as defined in claim 13 wherein the operations further comprise:
- retrieving the plurality of session records from a database; and
- filtering the plurality of session records based on a geographic location of the coverage area.

17. An apparatus as defined in claim 13 wherein a first session record for a first wireless session associated with the first wireless device includes:
- a device identifier for the first wireless device;
- identification information for each access point accessed by the wireless device during first wireless session; and
- time information.

18. An apparatus as defined in claim 17 wherein processing the plurality of session records includes comparing corresponding fields in the plurality of session records to a specified device identifier variable identifying the first wireless device, a first specified resource variable identifying the first access point and a second specified resource variable identifying the second access point.

* * * * *